United States Patent
Girold et al.

(10) Patent No.: US 7,503,188 B2
(45) Date of Patent: Mar. 17, 2009

(54) VITRIFICATION FURNACE WITH DUAL HEATING MEANS

(75) Inventors: Christophe Girold, Piolenc (FR); Lionel Bruguiere, Saint-Aunes (FR); Roger Boen, Saint Alexandre (FR); Armand Bonnetier, Orange (FR); Louis Bojat, Cavillargues (FR)

(73) Assignees: Commissariat A l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 337 days.

(21) Appl. No.: 10/510,519

(22) PCT Filed: Apr. 7, 2003

(86) PCT No.: PCT/FR03/01087

§ 371 (c)(1),
(2), (4) Date: Oct. 6, 2004

(87) PCT Pub. No.: WO03/084883

PCT Pub. Date: Oct. 16, 2003

(65) Prior Publication Data

US 2005/0120754 A1   Jun. 9, 2005

(30) Foreign Application Priority Data

Apr. 8, 2002   (FR) .................... 02 04328

(51) Int. Cl.
    C93B 5/02 (2006.01)
(52) U.S. Cl. ............... 65/135.6; 65/136.3; 373/155; 373/156
(58) Field of Classification Search .............. 65/135.6, 65/136.3, DIG. 4; 373/155, 156, 158
    See application file for complete search history.

(56) References Cited

U.S. PATENT DOCUMENTS

| 5,367,532 A | 11/1994 | Boen et al. |
| 5,750,822 A | 5/1998 | Gotovchikov et al. |
| 6,185,243 B1 | 2/2001 | Boen et al. |

FOREIGN PATENT DOCUMENTS

WO   98/05185   5/1998

*Primary Examiner*—Mark Halpern
(74) *Attorney, Agent, or Firm*—Nixon Peabody LLP

(57) ABSTRACT

Process for combustion and vitrification of waste in which at least one oxygen plasma jet is associated with a continuous melting device by high frequency direct induction. The crucible is composed of a continuous external shell and a sole plate, both cooled by a liquid circulating in internal channels. The inductor is placed below the sole plate. There is a gravity drain valve at the bottom or on the side.

9 Claims, 1 Drawing Sheet

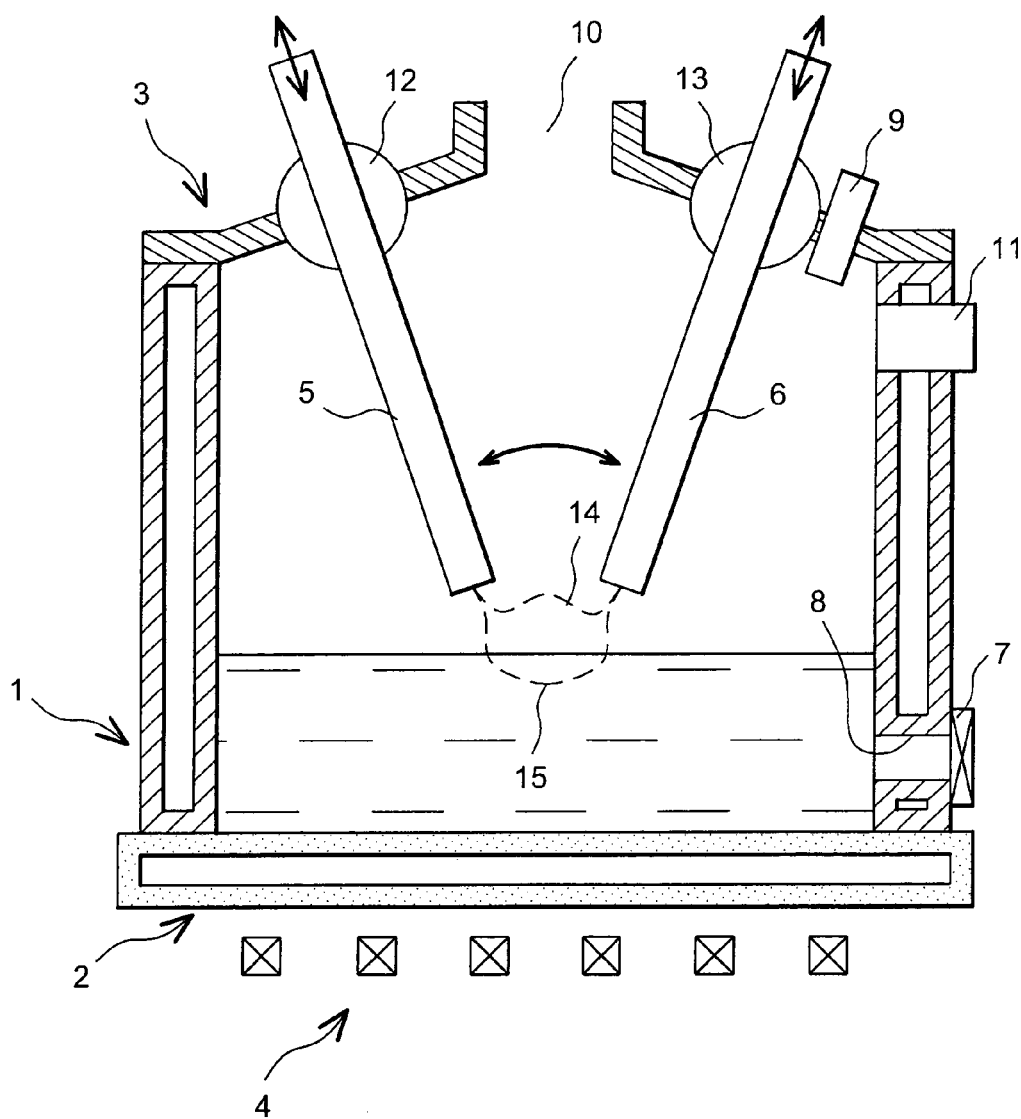

VITRIFICATION FURNACE WITH DUAL HEATING MEANS

This application is a 371 of PCT/FR03/01087 filed 7 Apr. 2003.

CROSS-REFERENCE TO RELATED APPLICATION

This application claims priority based on International Patent Application No. PCT/FR03/01087, entitled "Vitrification Furnace and Method With Dual Heating Means" by GIROLD, Christophe; BRUGUIERE, Lionel; BOEN, Roger; BONNETIER, Armand; and BOJAT, Louis, which claims priority of French Application No. 02 04328, filed on Apr. 8, 2002, and which was not published in English.

The invention described here relates to a furnace and a process for vitrification using two heating means, and relates to treatment of a wide variety of waste in a cooled metal unit by combustion and vitrification. The functions of the process are to completely incinerate combustible materials and confine the mineral fraction of the treated product within a matrix produced by melting at high temperature. The waste obtained is a glass (or a glass-ceramic body) containing toxic elements to be confined within its atomic structure.

TECHNICAL FIELD AND SUMMARY

A great deal of research work has been carried out for many years on immobilisation of the toxic fraction of various combustible waste in a vitreous, glass ceramic or crystalline type matrix, the toxicity being either chemical (including heavy metals) or radioactive. There are often several advantages such as stabilising waste, production of a tested and durable confinement matrix, reduction of the initial volume of waste, etc.

BACKGROUND

Obviously, research for an industrial process capable of both combustion and vitrification in a single, simple unit generating only small quantities of secondary waste is economically advantageous.

Several methods have been explored in research laboratories and at industrial scales. Essentially, the use of the thermal plasmas, variants using immersed or non-immersed electrodes and melting by direct induction have been considered.

Several processes have been developed for plasma treatment, but they have disadvantages that make industrial application difficult. Crucibles are made from refractory materials and wear quickly when in contact with molten glass (by corrosion in a complex aggressive medium) and also under intense plasma radiation. The treatment capacity of combustible waste in these plasma furnaces is also limited so as to protect linings made of refractory materials.

The most frequently used plasmagenic gases are nitrogen and air. In the first case, the generated plasma is only used as a heat source and not as a combustion element, which leads to simple cracking of organic molecules. This makes the chemical composition and treatment of fumes that contain a great deal of unburned materials, soot and dust and often nitrogen oxides, very complex. The use of air as the plasmagenic gas partially solves the disadvantages mentioned above, but 80% of the gases are then useless but are still heated, which means that gas treatment units are oversized.

Plasma fusion production using cooled crucibles has been tested to overcome the problem of refractories. Copper has been proposed as a material for the construction of crucibles, but it has the same disadvantage that it is sensitive to corrosion, particularly in a nitric medium; noble stainless steel is preferred to copper. However, heat transfers from the molten material in the crucible to the walls are such that melting is always made difficult, which makes it more difficult to create a sufficiently extensive bath and to empty the crucible.

The high frequency direct induction technique for melting in a metallic crucible, at least part of which is transparent to electromagnetic fields, is also known. With this technique, melting and production of a sufficiently large glass bath and casting are controlled. Known applications include the production of high purity glass and enamels, and vitrification of high activity radioactive waste. Relevant descriptions are found in French patent applications FR 91 02596 and FR 96 09382. But there are disadvantages with this process if it is applied to melting of a confinement matrix above which combustible elements are thrown. In particular, there is a strong chemical interaction between the waste to be treated and the molten material, resulting in important modifications of its composition and homogeneity. For example, reduction as far as the metallic phase of an oxide-based material (glass) is practically inevitable when the waste contains carbon or hydrogen or sulphur, even if air or oxygen blowing means are used in or on the bath. This result modifies the required properties for the ash confinement matrix and for correct electromagnetic operation of the process. Concerning surface combustion, depending on the calorific value of the treated waste, the temperature (therefore melting) of the surface layer of the molten material is not always guaranteed, and cooling may occur associated with an accumulation of material that remained solid. Note that a special process (susceptor, metallothermy, etc.) is always necessary when starting direct induction melting processes in a cold crucible when the molten material is not electrically conducting at low temperatures, which is the case for glass.

The purpose of the invention is to overcome all these disadvantages by presenting a hybrid process capable of decoupling combustion and vitrification functions in the same unit. The combustion function with control of the oxidising atmosphere is achieved by an oxygen plasma on the surface of the molten material, while the melting function is principally achieved by direct inductive heating in the molten material. The two functions become complementary in the process. Plasma is used to start melting, complete combustion at the surface, control of the oxidising atmosphere, increase in capacity and non-accumulation of waste at the surface, while direct induction simultaneously provides homogeneous melting of the material in the cooled structure and enables casting. Induction heating alone can be used in particular operating phases, if the surface temperature has to be moderate (recycling of volatile elements) or if the supplied product does not require combustion.

DETAILED DESCRIPTION

The invention is an installation and process for combustion—vitrification of incinerable or mineral waste, hereinafter referred to as the furnace. The furnace is characterised in that two heating modes are used, either associated or dissociated. The first heating mode is a thermal plasma of oxygen. The plasma generation means is above the surface of a molten material located in a crucible cooled by circulating fluids. The thermal plasma may be generated by a high frequency torch, a blown arc torch or a transferred arc torch. In the preferred embodiment described below, the plasma is an arc plasma generated between two mobile overhead torches covering all or part of the surface of the molten material.

The second heating mode uses an inductor used for heating the material contained in the crucible by direct induction. The crucible is composed of an external shell and a sole plate, both cooled by circulating fluids. At least one of the two parts of the crucible must be transparent to electromagnetic radiation (in other words sectorised if it is made of an electrically conducting material), so as to enable setting up of induced currents in the molten material contained in it. The inductor may be a helical winding around the outside of a shell or a flat winding under a sole plate.

The inductor is located under the sole plate and the crucible comprises a non-sectorised shell. This is justified by the fact that conducting dust may be formed during combustion on the surface, that creates short circuits between the isolated sectors (phenomenon that can damage the sectors), or layers of undissolved salts may be formed disturbing the shape of the electromagnetic field. Furthermore, induction on lateral walls facilitates heating of the surface of the glass bath, while induction under the sole plate facilitates heating of the bottom of the crucible. Heating of the bottom is ideal in the case of the invention since the plasma heats the glass surface. The sole plate may be a sectorised metal but in the preferred embodiment it is not sectorised because it is made of an electrically insulating material that is a good conductor of heat. Wear of this type of refractory materials is less serious in this case since the surface of the sole plate under the bath is not exposed to aggression by plasma and corrosive gas and dust. Structural continuity, contrary to sectorisation, is obviously advantageous since it also results in a homogeneous molten material with a vitreous nature that is very easy to make and has better resistance to wear, partly due to the lack of any seals between the sectors.

The oxidising atmosphere in the furnace principally avoids the formation of a metallic phase in the molten bath and can result in a homogeneous vitreous molten material, with complete combustion of the organic materials and in which subsequent treatment is simpler.

Prior art includes a document U.S. Pat. No. 5,750,822 that also describes two heating means, by an induction coil surrounding the sidewall and a plasma torch. Unlike the invention, the two heating means are used to encourage the appearance and separation of two phases with different natures (metallic and vitreous) in the molten bath, that are heated and melted by two separate means, plasma being assigned to the vitreous phase and induction to the metallic phase.

French patent 96 09382 already mentioned describes an inductor placed under the sole plate of a vitrification furnace, used as the only heating means.

Therefore the combination of two heating means according to the invention and the use of an oxygen plasma (oxygen introduced in different forms has proved to be insufficient) can result in a single non-metallic phase of the molten bath, and fairly uniform heating appropriate for the single phase.

The invention will now be described with reference to FIG. 1 attached for illustrative and non-limitative purposes, and represents the preferred embodiment of the invention.

The furnace according to the invention includes six main parts, namely a shell 1, a sole plate 2, a crown 3, an inductor 4, a cathode plasma torch 5, an anode plasma torch 6, and a drain valve 7.

The cold crucible is composed of the shell 1, the sole plate 2 and the crown 3. The shell 1 is a vertical shell made of cooled metal and is placed on the cooled horizontal sole plate 2. The shell 1 comprises a drain orifice 8 near the bottom closed off by the drain valve 7, which is sliding and is cooled.

In one variant, the drain orifice 8 may be placed on the sole plate 2. Neither the shell 1 nor the sole plate 2 are sectorised, which means that they are continuous around their entire circumference, and the sole plate 2 is made of an electrically insulating material, the shell 1 being metallic. A metallic and sectorised sole plate 2, therefore transparent to magnetic fields, could also be used.

The top of the crucible is formed by the crown 3 in which the cathode plasma torch 5 twinned with the anode plasma torch 6 is fitted, an orifice through which the material to be melted 9 is added, and an orifice for the waste to be treated 10. Combustion gases are routed towards the subsequent treatment through an orifice 11 near the top of the cooled crucible 1. In one variant, the orifice 11 may be placed on the crown 3.

The inner metallic faces of the crucible may be coated with a thin ceramic type layer.

In this embodiment, the inductor 4 is located under the sole plate and includes at least one flat winding.

In the embodiment described, the crucible and particularly the shell 1 and the sole plate 2 are circular with a central inductor 4, but they may have other shapes, particularly elliptical. In this special embodiment, the inductor 4 is not necessarily directly under the plasma torches 5 and 6, but it may be offset laterally to give priority to two areas in the furnace, one hotter with an oxidising atmosphere with plasma torches, and the other with a more moderate temperature, for example more suitable for continuous recycling of volatile elements.

In the preferred embodiment described herein, the plasma is generated using a system with two twinned plasma torches; it could be generated by a single torch system such as a single transferred arc type or a blown arc type system.

The plasma torches 5 and 6 are designed to operate twinned, one as an anode and the other as a cathode, after receiving an appropriate electrical polarisation. Both are composed of a cooled metallic electrode surrounded by a first inner sleeve supplied with source plasmagenic gas protecting the electrode from oxidation, and a second external sleeve supplied by the plasmagenic cladding gas. In this case, the plasmagenic cladding gas is oxygen. Torches are installed on ball joints 12 and 13 installed through the wall of the crown 3, which makes them free to move in the crucible and such that their distance can be adjusted. Any mechanical device, for example an adjustment screw, can also be used to modify the depth of the plasma torches 5 and 6 in the crucible by making them slide vertically (or approximately vertically) and thus bring them closer to or further from the surface of the molten material. Obviously, these possible movements of the torches 5 and 6 can advantageously provide a means of adjusting the shape and location of the intermediate arc.

The electric arc is initiated by a high voltage and high frequency discharge between the two torches 5 and 6. It may then be maintained either by circulating through the molten material along the path 15, or simply in air along path 14. These are the geometric positions of the torches 5 and 6 relative to each other and the electrical parameters of the arc and the plasmagenic gas flow that can be used to impose one of these operating modes. If the arc current circulates through the molten material, it makes a strong contribution to melting; however, when in air, the plasma is only used for its chemical function.

When the equipment is started, the torches 5 and 6 are brought sufficiently close to the material contained in the crucible so that it can start melting. As soon as a small quantity of material has melted and became conducting, the parameters are adapted to force the arc current to pass through the molten bath so that the bath will spread more quickly. When possible depending on the size of the bath formed, the high frequency current is applied to the inductor 4 and melting of the material by direct induction can be used instead.

Both heating modes can then be used, either in common or separately depending on the application. During the refining phase of a vitreous matrix, for example before casting, the plasma may not be necessary, exactly as if there were a period during which the atmosphere above the bath must be less oxidising. By using the two heating modes continuously, an attempt is made to prevent the formation of a metallic phase imposing a redox potential that could increase the volatility of some elements to be confined.

We will now describe the advantages provided by the preferred embodiment of the invention.

Starting with an arc plasma, regardless of the state of the material to be melted (electrically conducting or not), no current collecting counter-electrode immersed in the molten material (no pollution and immersed consumable material), operating flexibility due to the various possibilities of this arc mode (completely in air or partly circulating in the material), configuration of the arc plasma (cathode jet and anode jet) more appropriate to combustion than a simple plasma column; larger plasma volume, greater radiation, application to combustion—vitrification of organic material at the surface of a glass bath contained in a cold structure and heated only by plasma, is limited to a small crucible diameter due to heat losses to the walls. By adding another heating means, the invention provides a means of forming a very large bath of molten material, made with an entirely cold structure, while maintaining the advantages of oxygen plasma (good combustion) and limiting the negative effects of volatilisation (the plasma is no longer used to melt after starting, but simply for burning), for the same reasons as above, the problems of non-homogeneous melting of the material and emptying the cold wall crucible are solved, application of an oxygen plasma at the surface of a molten material limits or even eliminates interactions between this material and elements of the treated waste (oxidation-reduction, inclusion, etc.), separate control of the two functions of the process provides operating flexibility never been seen before, so that mixed combustion-vitrification cycles, or a vitrification cycle only can be envisaged, by adapting the parameters of each of the heating means (application to different natures of waste, recycling of volatile bodies, etc.), "combustion by plasma—heating by induction" combination also provides a solution to getting glass melting started in a cold glass crucible without the need to use associated means (metallothermy, susception, etc.).

Simply as an example, we will briefly describe an experimental application of the invention: combustion—vitrification of Ion Exchanger Resins (IER) contaminated with radio-elements on a glass in the nepheline family ($SiO_2$, $Na2O$, $Al2O3$). The treated IERs are a mix of equal parts of acid amberlite IRN77 and basic IRN78 (with mass composition C=69%, G=7%, O=14%, N=3%) containing 50% of water by mass. The experimental installation operates by batch; it is provided with a 60 cm diameter crucible filled with 50 kg of sintered glass and operates at nominal conditions with about 25 kW of plasma power and 50 kW of inductive electrical power. The average waste flow treated under the conditions mentioned above is about 10 kg/h during a feed period, there is no accumulation of waste at the surface, the waste is incorporated immediately. These values of the operating time and the capacity do not represent the maximum limits of the experimental installation. Perfect combustion of resins is obtained with an oxygen excess of 20%.

The lack of opaque fumes in the furnace is noted, with a very low quantity of carbon monoxide produced and no soot. The glass obtained is not reduced and contains practically all mineral elements contained in the waste.

This type of process is compact and simplifies steps in treating waste, it reduces the number and size of equipment, and many of its applications will be in the field of treatment of combustible radioactive waste. The invention has undoubted advantages for the treatment of a variety of type B waste (cellulose, plastic, IER, sludge, bitumen, graphite, etc.), due to the flexibility offered by the complementary nature of heating modes thus used and the small quantity of secondary waste generated.

By extension, applications for special industrial waste may be envisaged.

The invention claimed is:

1. Vitrification furnace comprising:
   a crucible; and
   at least one oxygen plasma torch on an upper part of the crucible and at least one inductor winding outside the crucible, the oxygen plasma torch configured to create an oxidising atmosphere in the furnace, characterised in that the inductor winding is arranged under the crucible.

2. Vitrification furnace according to claim 1, characterised in that the crucible comprises a sole plate made of refractory material and a shell placed upright on the sole plate, the shell having a continuous structure around a circumference and being made of metallic material.

3. Vitrification furnace according to claim 1, wherein the at least one plasma torch further comprises a first plasma torch and a second plasma torch, the first and second plasma torches configured to be electrically polarised to create an arc between each other.

4. Vitrification furnace according to claim 3, characterised in that the torches are moveable in the crucible.

5. Vitrification furnace according to claim 4, characterised in that the torches are free to slide approximately vertically with respect to the inductor winding.

6. Vitrification furnace according to claim 5, characterised in that the first and second torches heat the furnace load in the crucible and are brought close to the furnace load contents during heating.

7. Vitrification furnace according to claim 1, characterised in that the torch is laterally offset from the inductor winding.

8. Vitrification furnace according to claim 1, characterised in that the oxidising atmosphere in the furnace prevents formation of a metallic phase in furnace load contents in the crucible.

9. Vitrification furnace according to claim 1, wherein the torch exclusively heats furnace load content initially, wherein the torch and inductor winding both operate thereafter to simultaneously heat the furnace load contents.

* * * * *